INVENTOR.
ANDREW T. LING
BY
Carl V. Olson
Attorney

INVENTOR.
ANDREW T. LING
BY
Carl V. Olson
Attorney

INVENTOR.
ANDREW T. LING
BY Carl V. Olson
Attorney 3,373,408

COMPUTER CAPABLE OF SWITCHING BETWEEN PROGRAMS WITHOUT STORAGE AND RETRIEVAL OF THE CONTENTS OF OPERATION REGISTERS

Andrew T. Ling, Collingswood, N.J., assignor to Radio Corporation of America, a corporation of Delaware Filed Apr. 16, 1965, Ser. No. 448,708
11 Claims. (Cl. 340—172.5)

ABSTRACT OF THE DISCLOSURE

A computer includes one set of "instruction execution registers" for information used during execution of an instruction and not needed during execution of another instruction, and a plurality of sets of "program execution registers" for information used during execution of an instruction and needed also during execution of a following instruction in the same program. Each set of "program execution registers" is used in executing a corresponding different program. The particular set of "program execution registers" used at any particular time is determined by the contents of a processor state or program state register. The computer can switch from one program to another without the necessity of an intervening transfer to memory of all information needed later for continuing the interrupted program and without the necessity of a retrieval of all information needed at once for execution of the interrupting program.

This invention relates to electronic computer systems, and particularly to the central processor portion of computers.

In the operation of a general-purpose computer, the central processor is required to switch from one to another of several program routines as dictated by instructions encountered and conditions arising in the machine. The processor normally proceeds with the sequential execution of instructions of the user's program. Execution of the user's program may be interrupted for the purpose of entering into a program routine required by the need to service input-output equipments, to take care of information handling conditions arising during execution of the user's program, or to signal a malfunctioning of the computer hardware.

A processor normally includes instruction registers program counter registers, data accumulation registers, etc., for containing information concerning the program being executed. Whenever there is an interruption of the program being executed, the contents of many of the registers must be stored for use later when execution of the interrupted program is resumed, and information concerning the interrupting program must be transferred to the registers. This unloading and reloading of the registers is undesirably time consuming.

It is therefore a general object of this invention to provide an improved central processor construction by means of which the switch from the execution of any one program to the execution of another program is more rapidly and effectively accomplished.

In accordance with an example of the invention, a computer central processor contains operating registers which are divided into a first group labeled "instruction execution registers" for information used during execution of an instruction and not needed during execution of a following instruction, and a second group labeled "program execution registers" for information used during execution of an instruction of a program and needed also during execution of a following instruction of the same program. A plurality of different sets of program execution registers are included in the processor to provide an equal plurality of different processor states. The processor state which is operative at any given time is determined by a processor state control register, which enables a corresponding one of the sets of program execution registers. A logic-arithmetic unit has inputs coupled to receive signals from the instruction execution registers and the enabled one of the plurality of sets of program execution registers. The computer control unit controls the logic-arithmetic unit in its utilization of the contents of the instruction execution registers and the enabled one of the sets of program execution registers.

The control unit is operative in response to the presence of certain processor state control instructions in an operation code register to change the contents of the processor state control register. A program interrupt unit responsive to machine interrupt conditions is also operative to change the contents of the processor state control register. The computer can quickly switch from one processor state used for the execution of one program to another processor state used for the execution of another program, without the necessity of an intervening transfer to storage of all information needed later for continuing the interrupted program and a retrieval of all information needed at once for execution of the interrupting program. The system may also include means to control the action taken in the event that an instruction is reached which has been barred, by the programmer, from execution in the existing processor state of the computer.

Figure 1:
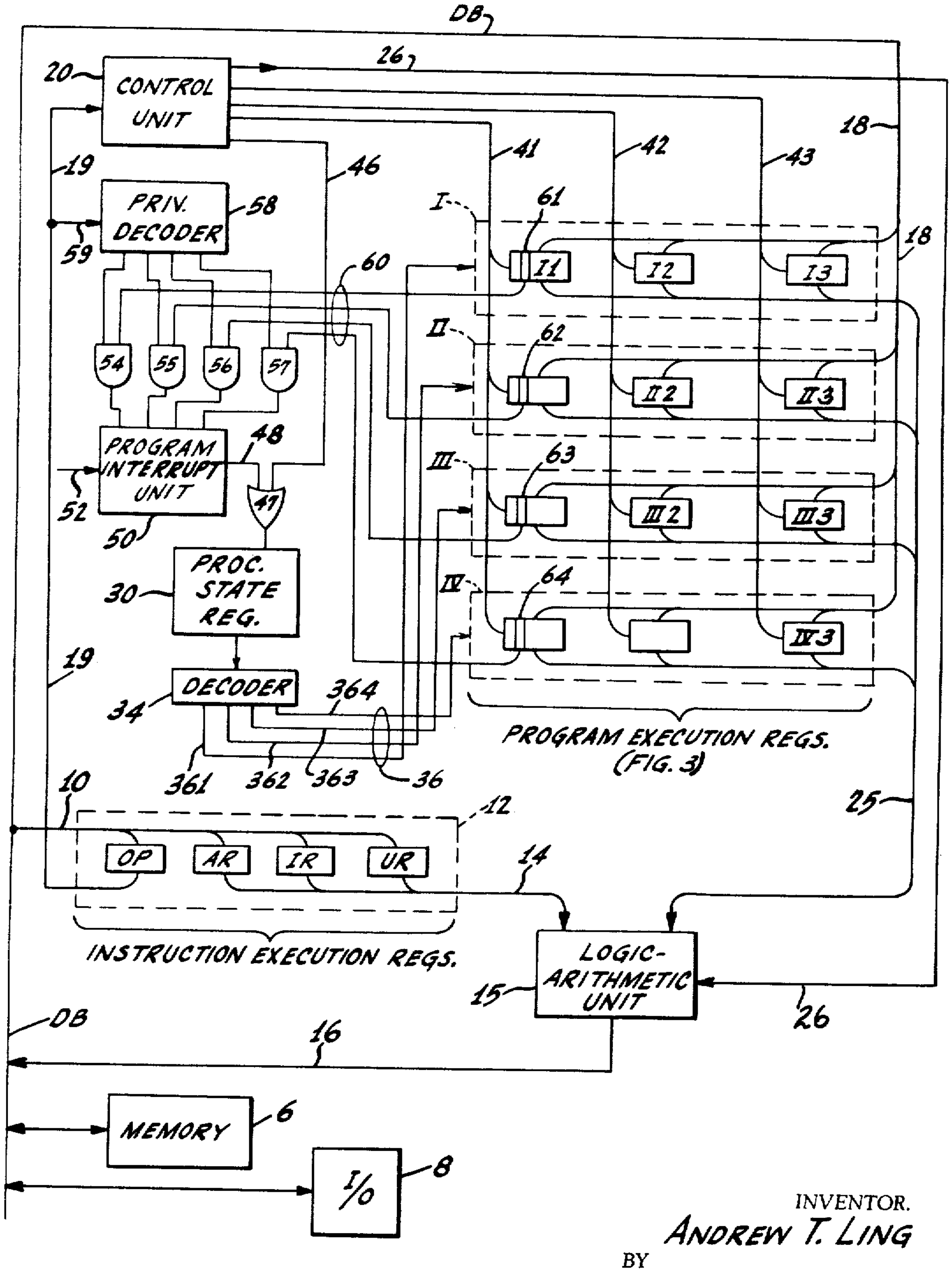
FIG. 1 is a block diagram of a computer system constructed according to the teachings of the invention.

Referring now in greater detail to FIG. 1 of the drawing, there is shown a computer system having a main data bus DB consisting of many individual electrical conductors for transferring data between the various units of the computer system. For example, the data bus DB is coupled to a high speed main memory 6 and to input-output device means 8. The data bus DB is also coupled over lines 10 to a plurality of instruction execution registers 12, and over line 18 to a plurality of sets I, II, III and IV of program execution registers. The instruction execution registers 12 are registers for information used during execution of an instruction and not needed during execution of a following instruction. The sets I, II, III and IV of program execution registers include registers for information used during execution of an instruction of a program and also needed during execution of a following instruction of the same program. Each of the sets I, II, III and IV of program execution registers are for use in the execution of a different program or program routine. The plurality of sets of program execution registers provide means for computer operation in any one of a corresponding plurality of different processor states.

Returning to the instruction execution registers 12, the individual registers shown include an operation code register O*p*, an address register AR, an intermediate register IR and a utility register UR. Although only four instruction execution registers are shown, any desired number may be employed and may also include a general counter register, an operand designator or counter register and an adder output register. Each of the individual instruction execution registers may provide for the storage of a large number, such as thirty-two, of information bits. The individual registers may consist of a number of flip-flop circuits equal to the number of information bits storable in the register. On the other hand, some or all of the individual registers may be constituted by storage locations in a small, fast, scratch-pad memory which differs from the main memory 6 in being considerably smaller and faster in operation.

The operation code register *Op* included among the instruction execution registers 12 has an output over line 19 to a computer control unit 20 which may be of a conventional type. The instruction execution registers 12 include other individual registers such as AR, IR and UR having outputs coupled over lines 14 to a logic-arithmetic unit 15, which in turn has output lines 16 coupled to the data bus DB. The operation code register *Op* may also have an output (not shown) coupled to the logic-arithmetic unit 15 for time shared use for another purpose.

The computer control unit 20 includes means to decode the contents of the operation code register *Op*, and the usual means to control the operation, in proper sequence, of all units of the computer system. The control unit 20 has an output connected over lines 26 to logic-arithmetic unit 15. The control unit 20 has many output control lines (not shown), in addition to those which are included on the drawing because they are more directly related to the units involved in the present invention. The logic-arithmetic unit may be a conventional unit capable of accepting one or two operands and performing functions dictated by the control unit 20. The logic-arithmetic unit 15 may have an output (not shown) directly to the program execution registers, in addition to the path through data bus DB.

The data bus DB is also connected over lines 18 to inputs of the individual registers in the four sets I, II, III and IV of program execution registers. The set I of program execution registers is shown as including individual registers I1, I2 and I3. Each of the individual registers will normally be capable of storing a large number, such as thirty-two, of information bits. The set I of program execution registers may include a large number, such as twenty-seven, of individual registers of which, according to an actual equipment, one is a program counter register, sixteen are general purpose registers, eight are floating point registers, one is an interrupt status register and one is an interrupt mask register. All of the individual registers in the set I of program execution registers are for information used during execution of an instruction of a program and needed during execution of a following instruction of the same program. The sets II, III and IV of program execution registers may also each include a program counter register, a number of general purpose registers, an interrupt status register and an interrupt mask register.

The individual register in the sets I, II, III and IV of program execution registers may be constructed of many of the usual flip-flop circuits. On the other hand, some or all of the individual registers may be constituted by storage locations in a small, fast, scratch-pad memory. The implementation of the individual registers in the form of either flip-flop circuits, or memory locations, is determined in a particular computer system by considerations of speed and cost. Outputs of all of the individual program execution registers in the sets I, II, III and IV are coupled by lines 25 to an input of the logic-arithmetic unit 15. The unit 15 is controlled over lines 26 from the control unit 20.

The sets I, II, III and IV of program execution registers are used one set at a time in the execution of four different respective programs. When one of the four sets of program execution registers is in use, the computer is said to be in a corresponding one of its four processor states. The four sets of program execution registers may be used for the execution of four different programs, which, according to an actual computer example, may be as follows: set I of registers is used for executing the computer user's production program, set II is used for the controlling or servicing of input-output devices, and the servicing of interrupt conditions, set III is used for analyzing interrupt conditions and for performing executive routines, and set IV is used for special executive routines such as those followed when malfunctions occur in the operation of the computer hardware. While four sets of registers are shown for purposes of illustration, a smaller or larger number of sets may be employed.

Figure 2:
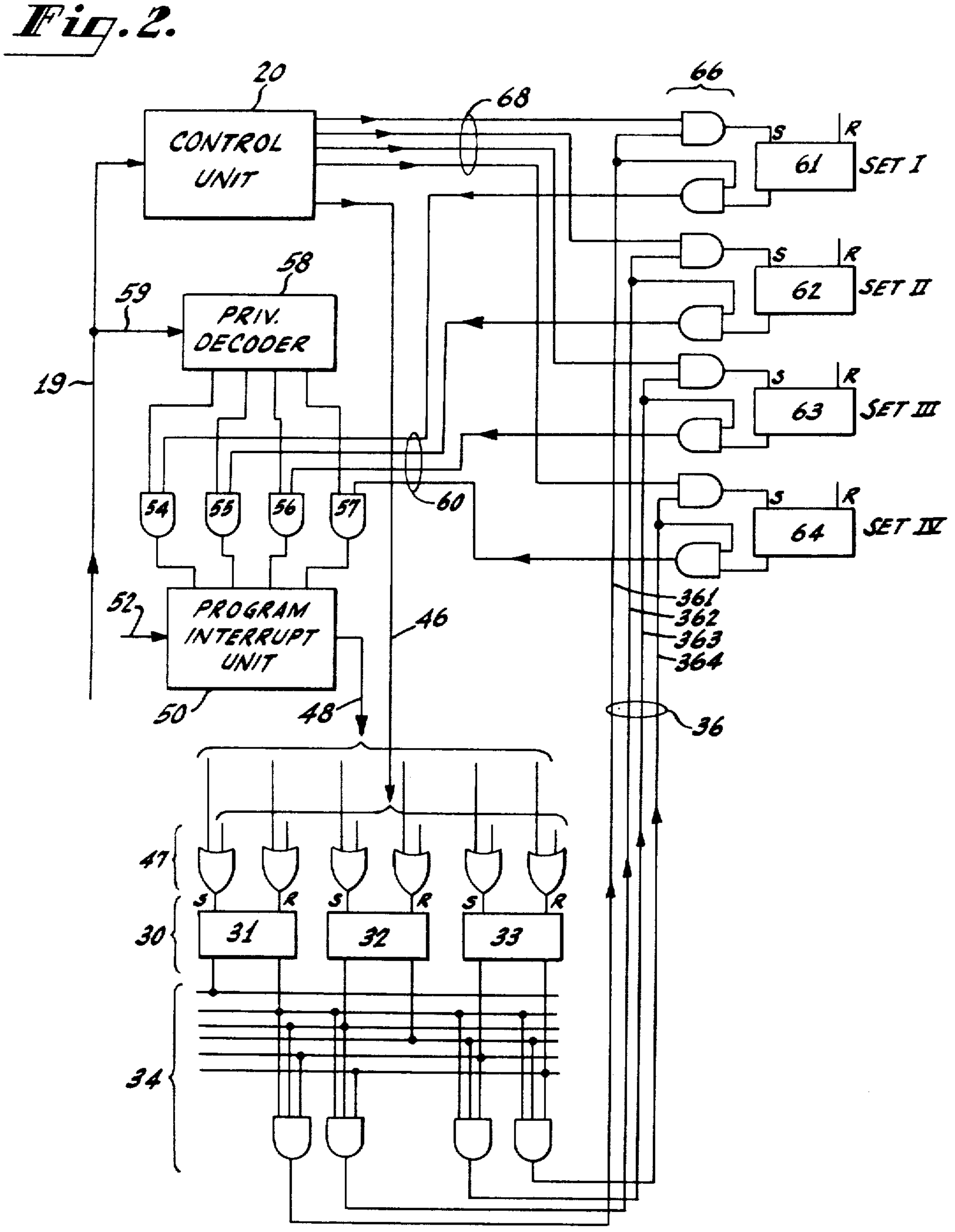
FIG. 2 is a block diagram showing portions of the system of FIG. 1 in greater detail.

The particular one of the four sets of program execution registers which is in use at any given time is determined by the contents of a processor state register 30 having outputs connected to a decoder 34. The processor state register 30 is shown in greater detail in FIG. 2 as including three flip-flops 31, 32 and 33. The decoder 34 is also shown as a conventional arrangement of "and" gates connected to the outputs of the processor state register flip-flops 31, 32, 33 in such a way as to provide energized outputs on one of four output lines 361, 362, 363 and 364 determined by the contents of the flip-flops. The four outputs of decoder 34 are connected, over lines generally designated 36, as enabling signals to the respective sets I, II, III and IV of program execution registers. "And" gates and "or" gates referred to herein are devices to perform the described functions and may be implemented in any one of many ways with consideration given to the polarities of the signals involved.

An energized output from decoder 34 in FIG. 1 to one of the sets of program execution registers enables inputs to, and outputs from, the selected one of the sets of registers. The enabling of inputs to, and outputs from, a set of registers is accomplished by an arrangement of "and" gates to be described later in connection with FIG. 3. Data signal inputs, from data bus DB and lines 18 to a particular one of the registers I1 through IV3 of an enabled set is controlled by enabling signals over lines 41, 42 and 43 from the control unit 20. At any given instant of time, one of the four sets I, II, III and IV of registers is enabled over one of lines 361, 362, 363, 364, and one of the registers within the enabled set is enabled over one of lines 41, 42 and 43.

If the registers I1 through IV3 are constituted by memory locations in a scratch pad memory, then the selection lines 361, 362, 363, 364, 41, 42, 43 are supplied to an address generator which generates the address in the memory of a selected register. The output of the address generator is supplied to the address register of the memory to access an individual register storage location. The data bus 18 and the data bus 25 are coupled to the data register of the memory for supplying data to an accessed register storage location and for delivering data from an accessed register storage location, respectively.

As has been stated, the processor state register 30 determines which of the four processor states is operative at any given time. The contents of the processor state register 30 is in turn determined by signals supplied to it over lines 46 and "or" gates 47 from the control unit 20, and to signals supplied to it over line 48 and "or" gates 47 from a program interrupt unit 50. The program interrupt unit 50 is a conventional unit constructed to recognize requests for interruption over lines 52 due to the occurrences of any one of many conditions arising in the computer. The conditions may arise from results obtained in the manipulation of data, the decoding of an instruction requesting the performance of an input-output function, a request for service by an input-output device, a malfunction in the operation of the computer hardware, etc. The program interrupt unit 50 provides signals over lines 48 to the processor state register 30 to cause the enabling of an appropriate different one of the sets I, II, III and IV of program execution registers for the entering into of an appropriate interrupt program or routine of instructions.

The program interrupt unit 50, in addition to receiving signals over lines 52, also receives signals through gates 54, 55, 56 and 57 from a privileged instruction decoder 58. The privileged instruction decoder 58 receives the contents of the operation code register *Op* over lines 19 and 59. Gates 54, 55, 56 and 57 are enabled over lines 60 from respective flip-flop circuits 61, 62, 63 and 64 included in registers (interrupt status registers) in respective ones of the sets of program execution registers I, II, III and IV. The flip-flop circuits 61, 62, 63 and 64 are shown in greater detail in FIG. 2. Inputs to and outputs from, the flip-flop circuits are controlled by pairs of "and" gates 66 which are enabled, one pair at a time, by signals over lines 36 from decoder 34. Inputs to the set inputs S of flip-flop circuits 61, 62, 63 and 64 are supplied through gates 66 and lines 68 from control unit 20. A path (not shown) may also be provided from the control unit 20 to the reset inputs R of the flip-flop circuits 61, 62, 63 and 64. The privileged instruction decoder 58 decodes each "privileged" instruction supplied to the control unit 20. If the instruction is one prohibited or barred from execution during the existing processor state, the computer is switched to another processor state in which an appropriate interrupt program routine can be entered into and executed.

Figure 3:
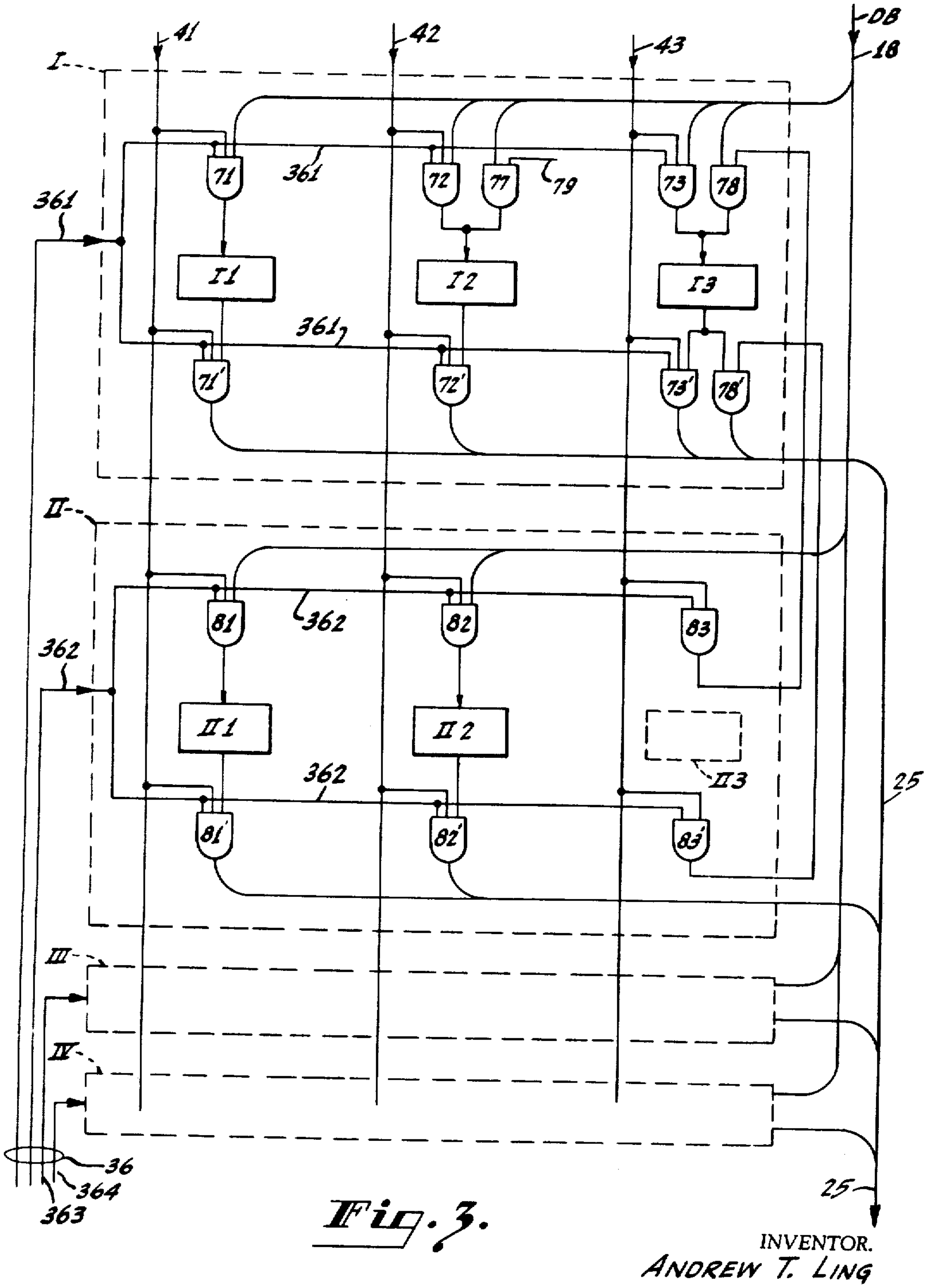
FIG. 3 is a block diagram showing a portion of the system of FIG. 1 in greater detail.

Reference is now made to FIG. 3 for a description in greater detail of the gate means for enabling individual program execution registers in the four sets I, II, III and IV shown in FIG. 1. The decoder output signal on line 361 applied to the set I of program execution registers tends to enable the input "and" gates 71, 72, 73 and the output "and" gates 71', 72', 73'. Similarly, the decoder output signal on line 362 applied to the set II of program execution registers tends to enable input "and" gates 81, 82, 83 and output "and" gates 81', 82', 83'. Sets III and IV contain a similar gating arrangement (not shown). A control unit output signal on line 41 tends to enable gates 71, 71' in set I, gates 81, 81' in set II, and corresponding gates (not shown)in sets III and IV. Likewise, a control unit output signal on line 42 tends to enable "and" gates 72, 72', 82, 82', etc., and a signal on line 43 tends to enable "and" gates 73, 73', 83, 83', etc.

The "and" gates are arranged in a rectangular matrix in which energization of one of the lines 361, 362, 363, and 364, together with energization of one of the lines 41, 42 and 43, enables a selected one of the registers I1, I2, I3, II1, II2, etc., to receive incoming data from data bus 18 and to supply outgoing data to bus 25. For example, if lines 361 and 41 are energized, gate 71 is enabled to pass data from data bus 18 to register I1, and gate 71' is enabled to pass data from register I1 to bus 25. Individual register I1 contains storage locations for many information bits. The "and" gate 71 provides a corresponding large number of information bit paths from individual conductors of data bus 18 to individual bit storage locations in register I1. All the other registers and "and" gates are similarly constructed.

When the computer is in processor state I, the set I of program execution registers is enabled by a signal on line 361. Similarly, in processor states II, III and IV, the respective sets II, III and IV of program execution registers are enabled by signals on respective lines 362, 363 and 364. The energized one of the control unit lines 41, 42, 43 determines the particular one of the individual registers in the enabled set which can receive or supply data at a given time.

Normally, when the computer is in a given processor state, it uses program execution registers of the corresponding set. However, an economy and operating advantages can be achieved by making a register in one set available for use during another or other processor states. A common register for floating point arithmetic operations may thus be used in all processor states. This is illustrated in FIG. 3 where a register II3 in set II is absent from the matrix, and the corresponding gates 83, 83' have outputs connected to gates 78 and 78' associated with register I3 in set I. The register I3 is thus available for use when the computer is in processor state II, as well as when it is in processor state I. Register I3 can also be connected for use during processor states III and IV.

Provision is also made for accessing a register in one column of one set from a different column of another set. For example, register I2 in set I is provided with a data-input "and" gate 77 which is enabled at an input 79 over a line (not shown) from the output of gate 83 in set II. The connection may be from a gate like gate 83 but located elsewhere in one of the sets II, III or IV. It has been found useful to in this way construct program execution registers so that when the computer is in processor state III, program count registers, interrupt mask registers and interrupt status registers in sets I and II are addressable as general registers (in set III) which are not actually physically present in set III. Then, later, when the computer is in processor state I or II, the computer can make immediate use of the information in set I or set II registers without the need for a transfer of information from a register in set III.

The operation of the computer system will now be described starting from a condition in which the computer is executing instructions contained in the computer user's production program. The computer is then in processor state I in which the set I of program execution registers is enabled to receive and send data signals. The enabling signal supplied to the set I of program execution registers is derived from the decoder 34 and is determined by the contents of the processor state register 30.

The execution of each sequential instruction in the user's production program is accomplished by transferring the instruction from the main memory 6 over the data bus DB and lines 10 to registers in the group 12 of instruction execution registers. The operation code register *Op* receives the operation code portion of the instruction. The contents of the operation code register *Op* is applied over lines 19 to the control unit 20 which controls all units of the computer in executing the instruction called for by the operation code. If, for example, the instruction is an "add" instruction, the operand address portion of the instruction included in the address register AR is employed to fetch the operand from the main memory 6 and place it in utility register UR included in the group 12 of instruction execution registers. Thereafter, the operand in register UR is applied over lines 14 to the logic-arithmetic unit 15. At the same time, the other operand located in a program execution register in set I is applied over bus 25 to the other input of logic-arithmetic unit 15. The resulting sum is applied from the logic-arithmetic unit 15 over lines 16, data bus DB and lines 18 to the same or another register in the set I of program execution registers. The sum is transferred to a program execution register because the sum may be needed during the execution of a following instruction.

The execution of sequential instructions of the user's production program continues until a condition arises requiring a switch to the execution of another program utilizing another one of the sets II, III or IV of program execution registers. The change in processor state may be brought about by signals from the program interrupt unit 50 to the processor state register 30, or signals from the control unit 20 to the processor state register 30. The new information thus entered into processor state register 30 is decoded by decoder 34 to produce an enabling signal on one of its output lines 36 which enables another one of the sets II, III or IV of program execution registers. The information contained in the set I of program execution registers is retained for use at a later time when the user's production program is resumed. It is unnecessary to take the time required to unload the contents of the set I of program execution registers into the main memory 6 and replace in the registers of set I the information needed for execution of the interrupting program. The information needed for the interrupting program is already present in the now-energized one of the sets II, III or IV of program execution registers.

The execution of the interrupting program routine continues until conditions arise which calls for a switch back to the programmer's production program processor state I or to another one of the remaining processor states. In this way, the computer switches back and forth among the four processor states without the necessity of an intervening transfer to storage of all information needed later for continuing an interrupt program and a retrieval of all information needed for execution of an interrupting program.

Various conditions resulting in a change of processor state will now be described. When the computer is in processor state I executing the user's program, a machine malfunction interrupt condition may arise which acts through the program interrupt unit 50 to change the contents of processor state register 30 to enable processor state IV. If an interrupt is caused by any other condition, the program interrupt unit 50 changes the contents of processor state register 30 to enable processor state III. Examples of such conditions are request for service of an input-output device, a console request, an address error, a data error, an exponent overflow, a divide error, etc. When the computer is in processor states IV or III, it follows routines which analyze the cause of the interrupt and lead to an instruction which is interpreted by the control unit 20 to cause a switch to processor state II. When the computer is in processor state II, it follows an appropriate routine determined by the cause of interrupt as analyzed during previous processor states IV or III. Thereafter, at the end of the routine of processor state II, an instruction is reached which causes a return to processor state I for a resumption of the user's production program.

From the foregoing it can be understood that some instructions should be executed only when the computer is in an appropriate one of its processor states. Such instructions as may come up for execution when the computer is in an inappropriate processor state are called "privileged" instructions, and means are provided for decoding these instructions in the privileged instruction decoder 58. When the operation code of a privileged instruction is present in operation code register O*p* for use by the control unit 20, it is first decoded by privileged instruction decoder 58 which then tends to enable one or some or all of the "and" gates 54, 55, 56 and 57. One of these "and" gates also receives a "1" or "0" signal from the one of flip-flop circuits 61, 62, 63 and 64 which is in the presently enabled set of program execution registers I, II, III or IV. The privileged instruction is then either executed by the control unit 20, or the program interrupt unit 50 is energized to cause a change to an appropriate processor state without executing the privileged instruction.

The example, suppose that the computer is in processor state I with the flip-flop 61 of register set I enabled, and also that a priviledged instruction is reached which is decoded by decoder 58 to provide an enabling signal to "and" gate 64. Then, if the instruction is prohibited in state I, and a "1" is present in flip-flop 61, and the "1" signal will enable an output from "and" gate 54 which acts on the program interrupt unit 50 to cause an interruption and a switch from processor state I to an appropriate different processor state. On the other hand, if a "0" is present in flip-flop 61, the "0" signal will not enable an output from "and" gate 54, and the instruction will be executed in processor state I by control unit 20.

The "1" and "0" contents of the flip-flops 61, 62, 63 and 64 in register sets I, II, III and IV can be changed by the programmer. That is, instructions included in a program can cause changes in the contents of the flip-flops for the purpose of determining, during the course of execution of the program, when privileged instructions will be allowed and when they will be prohibited from executions during particular processor states.

I claim:

1. A computer processor comprising:

instruction execution registers for information used during execution of an instruction and not needed during execution of a following instruction, a plurality of sets of program execution registers for information used during execution of an instruction of a program and needed during execution of a following instruction of the same program, a processor state control register having outputs coupled to enable inputs to, and outputs from, any selected one of said plurality of sets of program execution registers, a logic-arithmetic unit having inputs coupled to receive signals from said instruction execution registers and the enabled one of said plurality of sets of program execution registers, and a control unit operative to control said logic-arithmetic unit in its utilization of the contents of said instruction execution registers and the enabled one of said sets of program execution registers, said control unit also being operative in response to the presence of certain processor state control instructions in said operation code register to change the contents of said processor state control register.

2. A computer processor comprising:

instruction execution registers, including an operation code register, for information used during execution of an instruction and not needed during execution of a following instruction, a plurality of sets of program execution registers for information used during execution of an instruction of a program and needed during execution of a following instruction of the same program, said plurality of sets of program execution registers providing means for computer operation in any one of a corresponding plurality of different processor states, a processor state control register having outputs coupled to enable inputs to, and outputs from, any selected one of said plurality of sets of program execution registers, a logic-arithmetic unit having inputs coupled to receive signals from said instruction execution registers and the enabled one of said plurality of sets of program execution registers, a control unit operative to control said logic-arithmetic unit in its utilization of the contents of said instruction execution registers and the enabled one of said sets of program execution registers, said control unit also being operative in response to the presence of certain processor state control instructions in said operation code register to change the contents of said processor state control register, and a program interrupt unit responsive to machine interrupt conditions to change the contents of said processor state control register, whereby the computer can quickly switch from one processor state used for the execution of one program to another processor state used for the execution of another program without the necessity of an intervening transfer to storage of all information needed later for continuing the interrupted program and a retrieval of all information needed at once for execution of the interrupting program.

3. A computer processor comprising:

instruction execution registers, including an operation code register, for information used during execution of an instruction and not needed during execution of a following instruction, a plurality of sets of program execution registers for information used during execution of an instruction of a program and needed during execution of a following instruction of the same program, said plurality of sets of program execution registers providing means for computer operation in any one of a corresponding plurality of different processor states, a processor state control register having outputs coupled to enable inputs to, and outputs from, any selected one of said plurality of sets of program execution registers, a decoder coupled to said operation code register to detect instructions which may be either privileged or prohibited, gate means responsive to the output of said decoder and to a prohibit bit if present in a register in the energized one of said plurality of sets of program execution registers, and means responsive to the output of said gate means to change the contents of said processor state control register.

4. A computer processor comprising:

instruction execution registers, including an operation code register, for information used during execution of an instruction and not needed during execution of a following instruction, a plurality of sets of program execution registers for information used during execution of an instruction of a program and needed during execution of a following instruction of the same program, said plurality of sets of program execution registers providing means for computer operation in any one of a corresponding plurality of different processor states, a processor state control register having outputs coupled to enable inputs to, and outputs from, any selected one of said plurality of sets of program execution registers, a logic-arithmetic unit having inputs coupled to receive signals from said instruction execution registers and the enabled one of said plurality of sets of program execution registers, a decoder coupled to said operation code register to detect instructions which may be either privileged or prohibited, gate means responsive to the output of said decoder and to a prohibit bit if present in a register in the energized one of said plurality of sets of program execution registers, and a program interrupt unit responsive to the output of said gate means or to other machine interrupt conditions to change the contents of said processor state control register.

5. A computer processor comprising:

instruction execution registers, including an operation code register, for information used during execution of an instruction and not needed during execution of a following instruction, a plurality of sets of program execution registers for information used during execution of an instruction of a program and needed during execution of a following instruction of the same program, said plurality of sets of program execution registers providing means for computer operation in any one of a corresponding plurality of different processor states, a processor state control register having outputs coupled to enable inputs to, and outputs from, any selected one of said plurality of sets of program execution registers, a logic-arithmetic unit having inputs coupled to receive signals from said instruction execution registers and the enabled one of said plurality of sets of program execution registers, a control unit operative to control said logic-arithmetic unit in its utilization of the contents of said instruction execution registers and the enabled one of said sets of program execution registers, said control unit also being operative in response to the presence of certain processor state control instructions in said operation code register to change the contents of said processor state control register, a decoder coupled to said operation code register to detect instructions which may be either privileged or prohibited, gate means responsive to the output of said decoder and to a prohibit bit if present in a register in the energized one of said plurality of sets of program execution registers, and a program interrupt unit responsive to the output of said gate means or to other machine interrupt conditions to change the contents of said processor state control register.

6. A computer processor comprising:

instruction execution registers, including an operation code register, for information used during execution of an instruction and not needed during execution of a following instruction, a plurality of sets of program execution registers for information used during execution of an instruction of a program and needed during execution of a following instruction of the same program, said plurality of sets of program execution registers providing means for computer operation in any one of a corresponding plurality of different processor states, a data bus, a logic-arithmetic unit having inputs and having an output coupled to said data bus, a processor state control register having outputs for enabling respective sets of program execution registers, a control unit having outputs for enabling respective individual registers in all of said sets of program execution registers, and means responsive to an energized output of said processor state control register and an energized output of said control unit to enable an individual selected program execution register to receive inputs from said data bus and to supply outputs to said logic-arithmetic unit, said control unit being operative to control said logic-arithmetic unit in its utilization of the data from said instruction execution registers and an enabled one of said program execution registers.

7. A computer processor comprising:

instruction execution registers, including an operation code register, for information used during execution of an instruction and not needed during execution of a following instruction, a plurality of sets of program execution registers for information used during execution of an instruction of a program and needed during execution of a following instruction of the same program, said plurality of sets of program execution registers providing means for computer operation in any one of a corresponding plurality of different processor states, a data bus, a logic arithmetic unit having inputs and having an output coupled to said data bus, a processor state control register having outputs for enabling respective sets of program execution registers, a control unit having outputs for enabling respective individual registers in all of said sets of program execution registers, and gate means responsive to an energized output of said processor state control register and an energized output of said control unit to enable an individual selected program execution register to receive inputs from said data bus and to supply outputs to said logic-arithmetic unit, said individual selected program execution register being in the set of program execution registers determined by the energized output of said processor state control register, said control unit being operative to control said logic-arithmetic unit in its utilization of the data from said instruction execution registers and an enabled one of said program execution registers.

8. A computer processor comprising:

instruction execution registers, including an operation code register, for information used during execution of an instruction and not needed during execution of a following instruction, a plurality of sets of program execution registers for information used during execution of an instruction of a program and needed during execution of a following instruction of the same program, said plurality of sets of program execution registers providing means for computer operation in any one of a corresponding plurality of different processor states, a processor state control register having outputs for enabling respective sets of program execution registers, a control unit having outputs for enabling respective individual registers in all of said sets of program execution registers, and gate means responsive to an energized output of said processor state control register and an energized output of said control unit to enable an individual selected program execution register, at least one of said individual selected program execution registers being common to two or more of said sets of program execution registers.

9. A computer processor comprising:

instruction execution registers, including an operation code register, for information used during execution of an instruction and not needed during execution of a following instruction, a plurality of sets of program execution registers for information used during execution of an instruction of a program and needed during execution of a following instruction of the same program, a processor state control register having outputs for enabling respective sets of program execution registers, a control unit having outputs for enabling respective individual registers in all of said sets of program execution registers, and gate means responsive to an energized output of said processor state control register and an energized output of said control unit to enable an individual selected program execution register, said gate means being also capable of enabling an individual selected program register in a set of program execution registers other than the one determined by the energized output of said processor state control register.

10. A computer processor comprising:

instruction execution registers, including an operation code register, for information used during execution of an instruction and not needed during execution of a following instruction, a plurality of sets of program execution registers for information used during execution of an instruction of a program and needed during execution of a following instruction of the same program, said plurality of sets of program execution registers providing means for computer operation in any one of a corresponding plurality of different processor states, a data bus, a logic-arithmetic unit having inputs and having an output coupled to said data bus, a processor state control register having outputs for enabling respective sets of program execution registers, a control unit having outputs for enabling respective individual registers in all of said sets of program execution registers, and gate means responsive to an energized output of said processor state control register and an energized output of said control unit to enable an individual selected program execution register to receive inputs from said data bus and to supply outputs to said logic-arithmetic unit, said individual selected program execution register being in the set of program execution registers determined by the energized output of said processor state control register, said gate means being also capable of enabling an individual selected program register in a set of program execution registers other than the one determined by the energized output of said processor state control register, said control unit being operative to control said logic-arithmetic unit in its utilization of the data from said instruction execution registers and an enabled one of said program execution registers.

11. A computer processor comprising:

instruction execution registers, including an operation code register, for information used during execution of an instruction and not needed during execution of a following instruction, a plurality of sets of program execution registers for information used during execution of an instruction of a program and needed during execution of a following instruction of the same program, said plurality of sets of program execution registers providing means for computer operation in any one of a corresponding plurality of different processor states, a data bus, a logic-arithmetic unit having inputs and having an output coupled to said data bus, a processor state control register having outputs for enabling respective sets of program execution registers, a control unit having outputs for enabling respective individual registers in all of said sets of program execution registers, gate means responsive to an energized output of said processor state control register and an energized output of said control unit to enable an individual selected program execution register to receive inputs from said data bus and to supply outputs to said logic-arithmetic unit, said individual selected program execution register being in the set of program execution registers determined by the energized output of said processor state control register, said gate means being also capable of enabling an individual selected program register in a set of program execution registers other than the one determined by the energized output of said processor state control register, said control unit being operative to control said logic-arithmetic unit in its utilization of the data from said instruction execution registers and an enabled one of said program execution registers, said control unit further being operative in response to the presence of certain processor state control instructions in said operation code register to change the contents of said processor state control register, and a program interrupt unit responsive to machine interrupt conditions to change the contents of said processor state control register.

References Cited

UNITED STATES PATENTS

| | | | |
|---|---|---|---|
| 3,079,082 | 2/1963 | Scholten et al. | 340—172.5 X |
| 3,202,969 | 8/1965 | Dunwell et al. | 340—172.5 |
| 3,226,694 | 12/1965 | Wise | 340—172.5 |
| 3,245,047 | 4/1966 | Blaauw | 340—172.5 |

PAUL J. HENON, *Primary Examiner.*